US 6,474,291 B2

United States Patent
Collins et al.

(10) Patent No.: US 6,474,291 B2
(45) Date of Patent: Nov. 5, 2002

(54) CLEAN SHUTDOWN FOR INTERNAL COMBUSTION ENGINE WITH VARIABLE VALVE TIMING

(75) Inventors: Brett D. Collins, Ypsilanti; Stephen DeLaSalle, Saline, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/740,593

(22) Filed: Dec. 19, 2000

(65) Prior Publication Data

US 2002/0073955 A1 Jun. 20, 2002

(51) Int. Cl.$^7$ .......................... F02B 77/04; G06F 19/00; F01L 1/34
(52) U.S. Cl. .............................. 123/198 DB; 123/90.15; 701/112
(58) Field of Search ............................... 123/90.15, 481, 123/190 DB, 198 D, 198 F; 701/112

(56) References Cited

U.S. PATENT DOCUMENTS

| 5,255,641 | A |   | 10/1993 | Schechter | ................ | 123/90.11 |
| 5,404,844 | A |   | 4/1995  | Schechter | ................ | 123/90.12 |
| 5,692,463 | A |   | 12/1997 | Liang et al. | .............. | 123/90.11 |
| 5,730,098 | A | * | 3/1998  | Sasaki et al. | ......... | 123/198 DB |
| 5,743,221 | A |   | 4/1998  | Schmitz | .................... | 123/90.11 |
| 6,257,194 | B1 | * | 7/2001 | Kerns et al. | ............ | 123/198 D |
| 6,260,535 | B1 | * | 7/2001 | Froeschl et al. | ...... | 123/198 DB |
| 6,318,334 | B1 | * | 11/2001 | Reale et al. | .......... | 123/198 DB |

* cited by examiner

Primary Examiner—Tony M. Argenbright
Assistant Examiner—Hai Huynh
(74) Attorney, Agent, or Firm—Scott Confer; John Kajander; Larry Shelton (57) ABSTRACT

A four-stroke internal combustion engine is disclosed wherein fuel and exhaust vapors are purged from the manifolds and each cylinder when the engine is shut down to minimize emissions on subsequent startup. The engine includes a cylinder, a reciprocating piston within the cylinder, and a cylinder head. An exhaust port with an exhaust valve communicates with the cylinder and an exhaust manifold with an emissions control device. An intake port with an intake valve communicates with the cylinder. Upon engine shutdown, a controller sends signals to a variable valve timing system for opening the exhaust valve when the piston is in upward motion, later closing the exhaust valve when the piston is in upward motion, opening the intake valve when the piston is in downward motion, later closing the intake valve when the piston is in downward motion, and opening the exhaust valve when the piston is in upward motion.

30 Claims, 8 Drawing Sheets

CLEAN SHUTDOWN FOR INTERNAL COMBUSTION ENGINE WITH VARIABLE VALVE TIMING

BACKGROUND OF THE INVENTION

1. Field of the Invention

This invention relates to a four-stroke reciprocating piston internal combustion engine in which fuel and exhaust vapors are purged from the engine manifolds and each cylinder when the engine is turned off or in a shutdown condition in order to minimize emissions on subsequent engine startup.

2. Description of the Related Art

Conventional internal combustion engine startup is notoriously dirty in terms of emissions. Remnant fuel and exhaust vapors from previous engine operation are typically trapped in the intake manifold and cylinders when the conventional internal combustion engine is turned off. These remaining vapors, which are subsequently forced out of the engine and through a cold, ineffective catalytic converter at engine startup, are a significant contribution to the overall emissions detected during standardized emissions tests.

What is needed, therefore, is a clean internal combustion engine shutdown method wherein fuel and exhaust vapors that would normally be trapped in the intake manifold and cylinders when the engine is turned off or in a shutdown condition are instead expelled through the warm catalytic converter when the engine is shut down, thereby producing a noticeable improvement in engine emissions during engine startup.

SUMMARY OF THE INVENTION

The foregoing needs are met by a four-stroke reciprocating internal combustion engine including a combustion chamber defined by a cylinder, a reciprocating piston contained within the cylinder, and a cylinder head. The engine includes an exhaust port in fluid communication with the combustion chamber and an exhaust manifold, which is in fluid communication with an emissions control device. The exhaust port includes an exhaust valve for controlling the release of gases from the combustion chamber. The engine also includes an intake port in fluid communication with the combustion chamber. The intake port is in fluid communication with a fuel injector for directing fuel into air in the intake port to form an air-fuel mixture. The intake port includes an intake valve for controlling the induction of the air-fuel mixture into the combustion chamber. The engine cylinder includes a spark device for igniting the air-fuel mixture introduced into the combustion chamber through the intake port. In an alternative version of the engine, the fuel injector is in fluid communication with the combustion chamber and directs fuel into air inducted into the combustion chamber through the intake port. The engine further includes at least one sensor for sensing at least one engine operating condition.

Operation of the engine is controlled by an engine controller which is responsive to each sensor. The controller provides fuel injector control signals to the fuel injector for operating the fuel injector, spark device control signals to the spark device for operating the spark device, and valve control signals to a variable valve timing system for operating the exhaust valve and the intake valve. The controller executes a stored program including an engine shutdown sequence in which the controller: (a) senses when the engine is in a shutdown condition, (b) thereafter stops providing a fuel control signal to the fuel injector thereby ceasing fuel injection from the fuel injector, (c) thereafter provides a signal to operate the spark device to ignite the air-fuel mixture in the combustion chamber, (d) thereafter provides a signal to open the exhaust valve, (e) thereafter provides a signal to close the exhaust valve after the reciprocating piston has been in upward motion for a time period, (f) thereafter provides a signal to open the intake valve when the reciprocating piston is in downward motion, (g) thereafter provides a signal to close the intake valve after the reciprocating piston has been in downward motion for a time period, and (h) thereafter provides a signal to open the exhaust valve when the reciprocating piston is in upward motion.

The engine shutdown sequence that is initiated by the engine controller when the engine is in a shutdown condition serves to expel fuel and exhaust vapors, which would normally be trapped in the intake manifold and cylinders of a conventional engine, through the warm catalytic converter. During the engine shutdown sequence, the opening and closing of the intake valve and the exhaust valve are timed to induct air and any other vapors into the combustion chamber from the intake port and to thereafter expel the contents of the combustion chamber out through the exhaust port, the exhaust manifold, and the emissions control device. In one version of the invention, the engine shutdown sequence is programmed such that the intake valve opens after Top Dead Center (TDC) and closes prior to Bottom Dead Center (BDC) of the piston and the exhaust valve opens after BDC and closes prior to TDC of the piston. The timing of the opening and closing of the intake valve during downward motion of the piston and the timing of the opening and closing of the exhaust valve during upward motion of the piston can be varied infinitely because of the use of a variable valve timing system. In an example embodiment of the invention, the engine shutdown sequence is programmed such that the intake valve opens just after TDC (e.g., within 5 degrees of TDC) and closes just prior to BDC (e.g., within 5 degrees of BDC) of the piston and the exhaust valve opens just after BDC (e.g., within 5 degrees of BDC) and closes just prior to TDC (e.g., within 5 degrees of TDC) of the piston. This allows for complete cycling of intake air through the cylinder minimizing pumping losses. In the engine shutdown sequence, the inertia stored in the engine is used to breath the cylinders and manifolds during an engine shutdown condition.

It is therefore an advantage of the invention to provide a four-stroke reciprocating piston internal combustion engine in which fuel and exhaust vapors are purged from the engine manifolds and each cylinder when the engine is shut down in order to minimize emissions on subsequent engine startup.

It is another advantage of the invention to provide a clean internal combustion engine shutdown method wherein fuel and exhaust vapors that would normally be trapped in the intake manifold and cylinders when the engine is turned off or in a shutdown condition are instead expelled through the warm catalytic converter when the engine is shut down, thereby producing a noticeable improvement in engine emissions during engine startup.

BRIEF DESCRIPTION OF THE DRAWINGS

These and other features, aspects, and advantages of the present invention will become better understood upon consideration of the following detailed description, appended claims and accompanying drawings in which:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Figure 1:
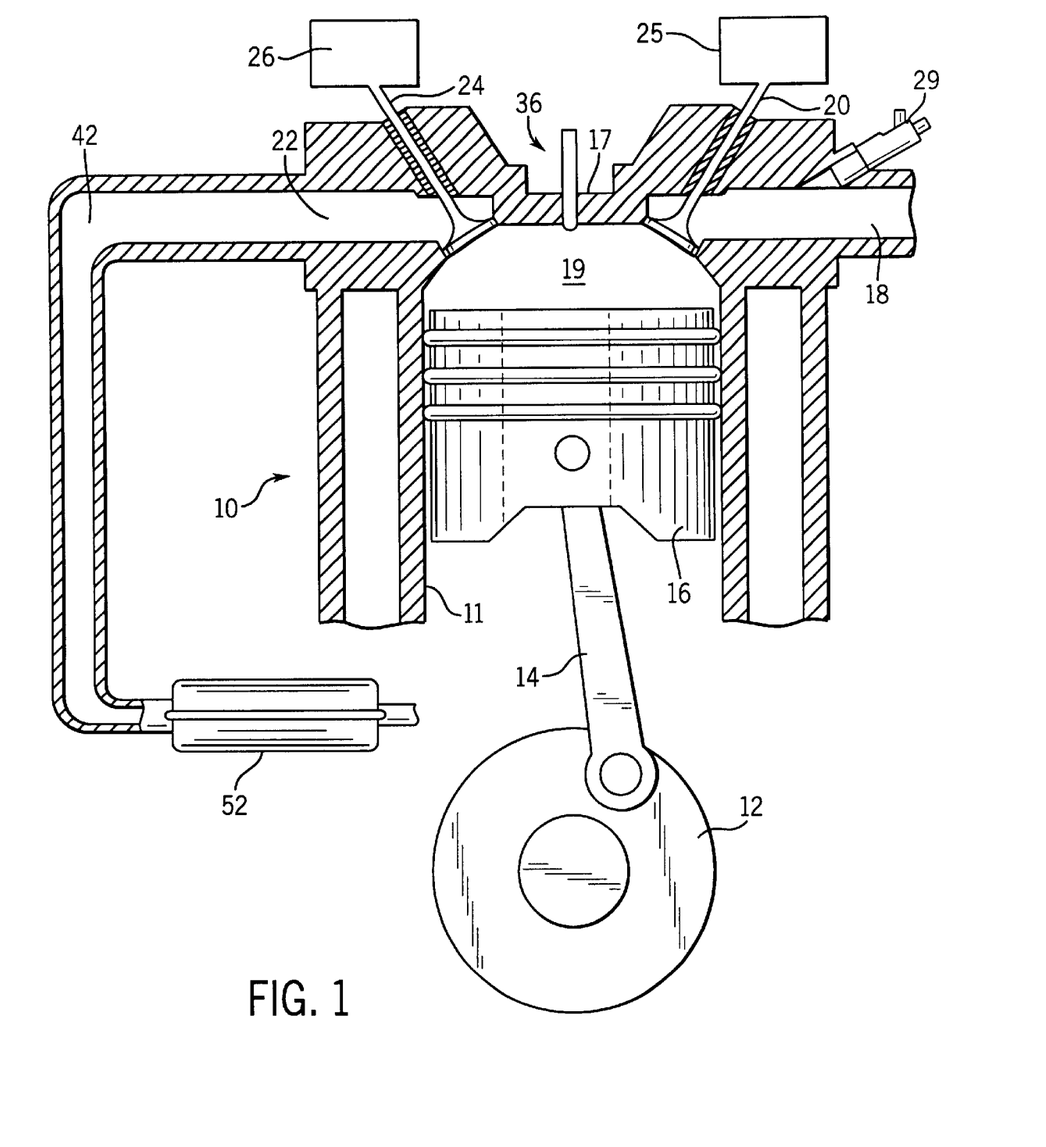
FIG. 1 is a schematic representation of an embodiment of a variable valve controlled engine that can incorporate the present invention.

Referring to FIG. 1, there is shown one cylinder of a multi-cylinder four-stroke cycle reciprocating internal combustion engine 10 in which the present invention can be practiced. The engine 10 has a cylinder 11, a crankshaft 12 with a connecting rod 14 and a reciprocating piston 16 disposed within the cylinder 11. A cylinder head 17 closes an end of the cylinder 11 and cooperates with the piston 16 to define a combustion chamber 19. The combustion chamber 19 communicates with an intake port 18 and an exhaust port 22 by an intake valve 20 and an exhaust valve 24, respectively. The intake valve 20 is operated by an intake valve actuator 25 and the exhaust valve 24 is operated by an exhaust valve actuator 26. A fuel injector 29 is arranged in fluid communication with the intake port 18 for injecting fuel into air in the intake port 18. The exhaust port 22 is also in fluid communication with an exhaust manifold 42, which is in fluid communication with an emissions control device 52, such as a catalytic converter, a charcoal canister, or other known emissions filtering/reduction device(s). A spark device 36, which may be a conventional spark plug known to those skilled in the art, is mounted in the cylinder head 17 for igniting the air-fuel mixture contained in the combustion chamber 19. While one cylinder, one intake valve, one exhaust valve, one intake port, and one exhaust port are shown in FIG. 1, it should be understood that the present invention can be used with an engine having multiple cylinders, intake valves, exhaust valves, intake ports, and exhaust ports. Typically, such a multiple cylinder engine will have a single exhaust manifold 42 and emissions control device 52.

Figure 1A:
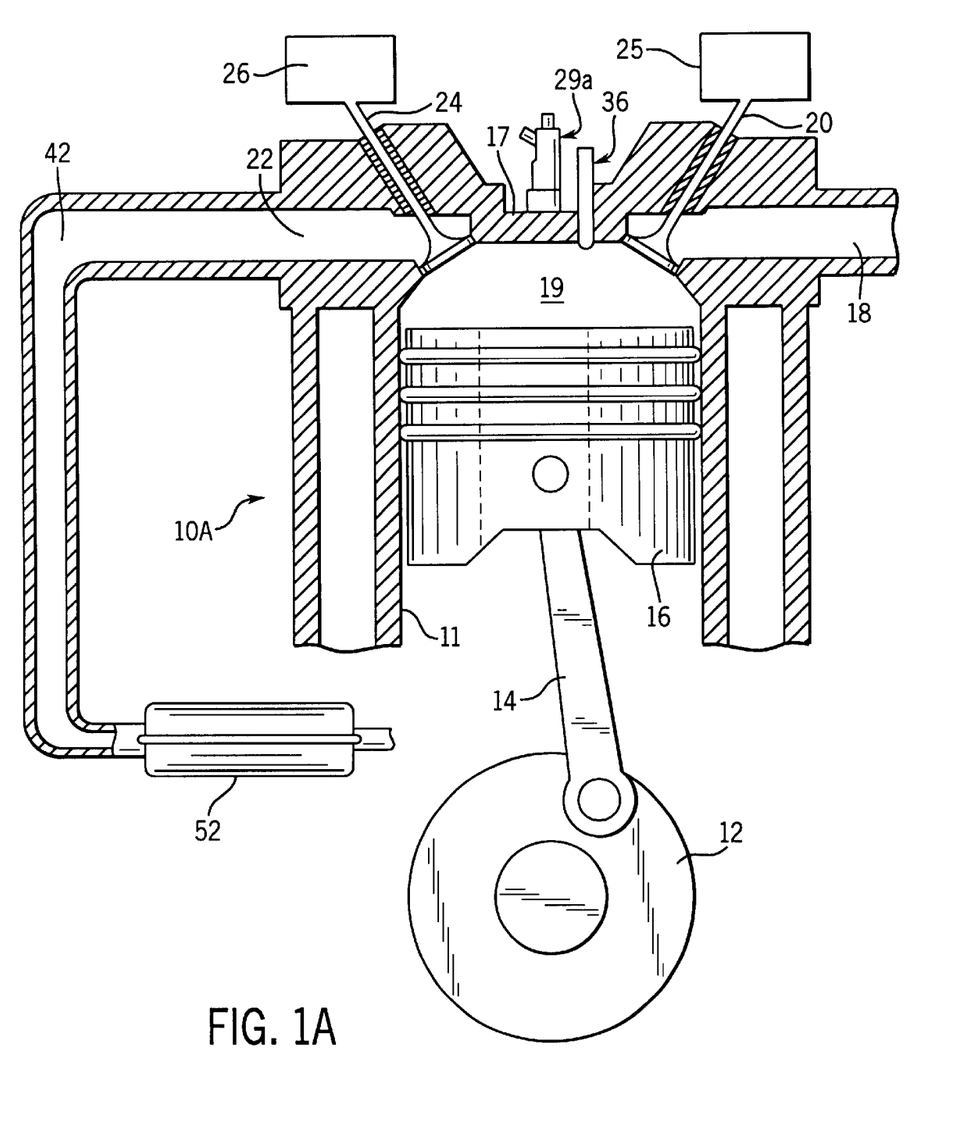
FIG. 1A is a schematic representation of another embodiment of a variable valve controlled engine that can incorporate the present invention.

Turning now to FIG. 1A, there is shown one cylinder of another multi-cylinder four-stroke cycle reciprocating internal combustion engine 10A in which the present invention can be practiced. The engine 10A has a cylinder 11, a crankshaft 12 with a connecting rod 14, a reciprocating piston 16, a cylinder head 17, an intake port 18, an exhaust port 22, an intake valve 20, an exhaust valve 24, an intake valve actuator 25, an exhaust valve actuator 26 and a spark device 36 as in the engine 10 of FIG. 1. The exhaust port 22 is also in fluid communication with an exhaust manifold 42, which is in fluid communication with an emissions control device 52, as in FIG. 1. However, in the engine 10A of FIG. 1A, a fuel injector 29a is mounted in the cylinder head 17 for injecting fuel directly into the combustion chamber 19. While one cylinder, one intake valve, one exhaust valve, one intake port, and one exhaust port are shown in FIG. 1A, it should be understood that the present invention can be used with an engine having multiple cylinders, intake valves, exhaust valves, intake ports, and exhaust ports. Typically, such a multiple cylinder engine will have a single exhaust manifold 42 and emissions control device 52.

Figure 2:
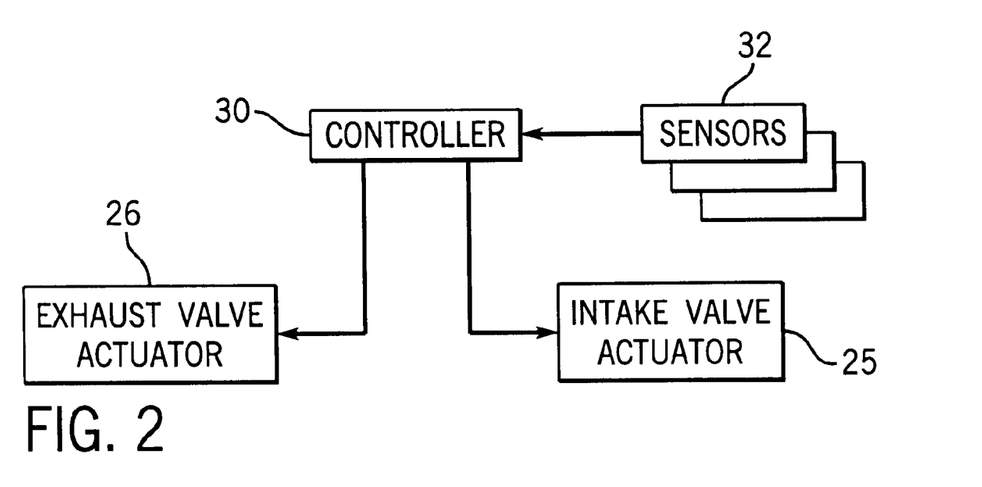
FIG. 2 is a block diagram of a control system for use with the engines of FIGS. 1 and 1A.

FIG. 2 illustrates an engine control system for controlling operation of the engine of FIG. 1 or the engine of FIG. 1A. An engine controller 30 receives a variety of inputs from engine operating sensors 32, which include many of the types of sensors known to those skilled in the art of engine control and suggested by this disclosure. For instance, the engine operating sensors 32 may sense parameters such as engine speed, engine load, air-fuel ratio, intake manifold absolute pressure, engine intake air mass flow rate, engine exhaust temperature, exhaust manifold absolute pressure, engine temperature, vehicle speed, vehicle gear selection, accelerator position, and other parameters known to those skilled in the art and suggested by this disclosure. The engine controller 30, which may comprise an electronic engine operating controller drawn from many types known to those skilled in the art of automotive electronic engine controllers, compares sensed operating parameters with predetermined values and outputs electrical signals that control various engine actuators. For example, in the present invention, the engine controller 30 is electrically connected to the intake valve actuator 25 and the exhaust valve actuator 26, and the engine controller 30 outputs electrical signals that are used by the intake valve actuator 25 and the exhaust valve actuator 26 to control motion of the intake valve 20 and exhaust valve 24, respectively. In addition, the engine controller 30 is electrically connected to the fuel injector 29 (FIG. 1) or 29a (FIG. 1A) and the spark device 36 for controlling the delivery of fuel to the combustion chamber 19 and the ignition of the air-fuel mixture in the combustion chamber 19.

The intake valve 20, the exhaust valve 24, the intake valve actuator 25 and the exhaust valve actuator 26 form part of a variable timing valve system known in the art. For example, valvetrains controlled by a variable timing electrohydraulic camless valve system are shown in U.S. Pat. Nos. 5,404,844 and 5,255,641, and valvetrains controlled by a variable timing electromagnetic camless valve system are shown in U.S. Pat. Nos. 5,743,221 and 5,692,463. Each of these patents is incorporated herein by reference. These types of valvetrains provide flexibility in which the timing of the intake valve 20 and the exhaust valve 24 can be varied. Accordingly, as used herein, the term "variable valve timing system" will be used to describe a valvetrain in which the timing of the intake valve 20 and the exhaust valve 24 can be varied. For instance, in the preferred version of the present invention, the intake valve actuator 25 and the exhaust valve actuator 26 receive signals from the engine controller 30 and enable variable timing of the intake valve 20 and the exhaust valve 24.

During operation of the engine 10 of FIG. 1 in accordance with the present invention, the controller 30 sends a signal to the fuel injector 29 so that fuel is injected into air in the intake port 18 from fuel injector 29 either while the intake valve 20 is closed or open to produce an air-fuel mixture. The engine controller 30 receives and processes sensed parameters, and the engine controller 30 commands the intake valve actuator 25 to operate the intake valve 20 to induce varied levels of the air-fuel mixture into the combustion chamber 19 during the intake stroke to achieve the required load. The controller 30 then sends signals to the spark device 36 to ignite the air-fuel mixture in the combustion chamber 19 as is well known in the art.

During operation of the engine 10A of FIG. 1A in accordance with the present invention, the engine controller 30 receives and processes sensed parameters, and the engine controller 30 commands the intake valve actuator 25 to operate the intake valve 20 to induce varied levels of air into the combustion chamber 19 during the intake stroke to achieve the required load. The controller 30 then sends a signal to the fuel injector 29a to direct fuel into the air in the combustion chamber 19. The controller 30 then sends a signal to the spark device 36 to ignite the air-fuel mixture in the combustion chamber 19 as is well known in the art.

The exhaust valve actuator 26 and the exhaust valve 24 are used to exhaust gas from the exhaust port 22 during the exhaust stroke of the engine 10 or 10A. The engine controller 30 sends an electrical signal to the exhaust valve actuator 26. The exhaust valve actuator 26 then operates the exhaust valve 24 so that exhaust gas may flow from the exhaust port 22 during the exhaust stroke.

Figure 3A:
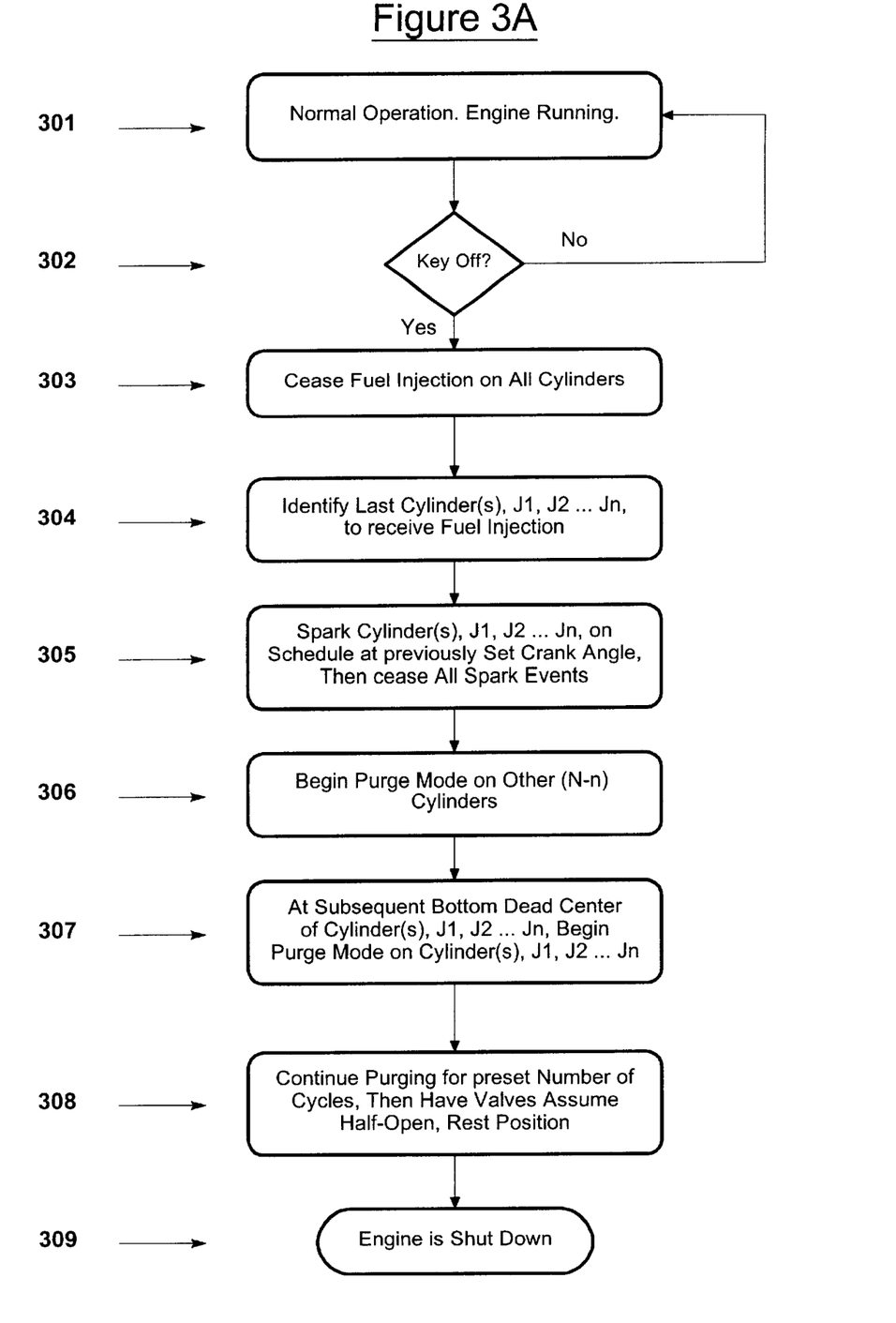
FIG. 3A is a block diagram of a program that may be stored in an engine controller for operating the engine shown in FIG. 1 or the engine shown in FIG. 1A.

Having described engines (engine 10 in FIG. 1 and engine 10A in FIG. 1A) in which the present invention may be practiced, reference can now be made to FIG. 3A, which shows a block diagram of a program that can be stored in the engine controller 30 for operating the engines 10 and 10A in accordance with the present invention. At Step 301, a multi-cylinder engine having a construction as in engine 10 or 10A and having N (where N is two or greater) cylinders is operated according to a normal engine operating sequence such as that described above. (It should be noted that the engine operation sequence also works for a single cylinder engine.) At Step 302, the controller 30 continually checks the key on/off signal from an engine on/off switch, which may be a conventional vehicle on/off switch. If the controller 30 senses that the key on/off signal is at an "on" level (i.e., the key is in the "on" position), the key on/off check returns a "no" value and normal engine operation continues at Step 301.

If the controller 30 senses that the key on/off signal is at an "off" level (i.e., the key is in the "off" position), the key off check returns a "yes" value and the engine shutdown sequence of Steps 303 to 309 is initiated. At Step 303, the controller 30 stops providing a fuel injection control signal to each fuel injector 29 or 29a thereby ceasing fuel injection. It can be appreciated by those skilled in the art that if Step 303 begins during the fuel injection process (i.e., the controller 30 stops providing a fuel injection control signal to each fuel injector 29 or 29a and fuel injection ceases), the result would be a lean burn or a single uncombusted misfire with fuel vapor content. Therefore, various options may be programed for Step 303. For instance, the fuel injection control strategy at Step 303 can include a command not to cease a fuel injection in process and delay the initiation of Steps 303 to 309. Alternatively, the fuel injection control strategy at Step 303 can immediately cease fuel injection, even when a fuel injection is in process. It should be noted that in many multi-cylinder engines, particularly those having more than four cylinders, fuel injection may be occurring at the same time in more than one cylinder. The fuel injection control strategy at Step 303 can account for the operation of these multi-cylinder engines by stopping fuel injection on multiple cylinders.

At Step 304 of FIG. 3A, the controller 30 identifies one or more cylinders that were last receiving fuel injection (the "last injected cylinder(s)" designated as "J1, J2 . . . Jn" in FIG. 3A) when Step 303 was initiated. For example, if one cylinder was receiving fuel injection when the key off signal was received by the controller 30, one last injected cylinder J1 (n=1) is identified; if two cylinders were receiving fuel injection when the key off signal was received by the controller 30, two last injected cylinders J1 and J2 (n=2) are identified; and if "n" cylinders were receiving fuel injection when the key off signal was received by the controller 30, "n" last injected cylinders J1 to Jn are identified.

At Step 305, the controller 30 sends signals to each of the spark devices 36 of last injected cylinder(s) J1 to Jn to ignite the air-fuel mixture in the combustion chamber 19. Thereafter, the controller 30 stops sending spark signals to all of the spark devices 36. At Step 306, the engine controller begins a "Purge Mode" of operation for all cylinders other than the last injected cylinder(s) J1 to Jn of the engine 10 or 10A. In Step 306 of FIG. 3A, "Purge Mode" simply refers to an engine operating sequence programmed into the controller 30 in which the opening and closing of the intake valve 20 and exhaust valve 24 (by way of intake valve actuator 25 and exhaust valve actuator 26) are timed to induct air into the combustion chamber 19 from the intake port 18 during piston downstroke and to thereafter expel the contents of the combustion chamber 19 during piston up stroke out through the exhaust port 22, the exhaust manifold 42, and the emissions control device 52. The Purge Mode in an example embodiment is programmed such that the intake valve 20 opens just after Top Dead Center (TDC) and closes just prior to Bottom Dead Center (BDC) of the piston 16, and the exhaust valve 24 opens just after BDC and closes just prior to TDC of the piston 16. Preferably, there is no overlap between the opening of the intake valve 20 and the opening of the exhaust valve 24, thereby assuring complete cycling of intake air through the cylinder 11 minimizing pumping losses.

At Step 307, the piston 16 of the last injected cylinder(s) J1 to Jn has reached BDC after the final spark event in the last injected cylinder(s) J1 to Jn. At BDC of the piston 16, the Purge Mode is initiated for the last injected cylinder(s) J1 to Jn. As detailed above, the Purge Mode on the last injected cylinder(s) J1 to Jn (and all other cylinders which are already in the Purge Mode) involves: (1) opening the exhaust valve 24 when the piston 16 is in upward motion thereby expelling the contents of the combustion chamber 19 out through the exhaust port 22, the exhaust manifold 42, and the emissions control device 52, (2) thereafter closing the exhaust valve 24 after the piston 16 has been in upward motion for a time period or is at TDC, (3) opening the intake valve 20 when the piston 16 is in downward motion to induct air into the combustion chamber 19 from the intake port 18, and (4) thereafter closing the intake valve 20 after the piston 16 has been in downward motion for a time period or is at BDC.

It can be appreciated by one skilled in the art that intake and exhaust valves often open and/or close before and after top and bottom center. For example, the last injected cylinder(s) to have a spark event may open their associated exhaust valve several degrees before bottom dead center. For instance, one typical profile opens the exhaust valve approximately 65 degrees before bottom dead center as there is not much mechanical advantage gained during this part of the expansion stroke, and the extra time to exhaust the cylinder reduces pressure/work on the up stroke. In this type of valve timing arrangement, the preferred Purge Mode in which the opening of the exhaust valve 24 occurs when the piston 16 is in upward motion would not begin immediately after the final spark event as the exhaust valve has already opened approximately 65 degrees before bottom dead center of the expansion stroke.

At Step 308, the controller 30 follows a program sequence in which the Purge Mode is repeated for a preset number of cycles of the engine 10 or 10A. Because the engine 10 or 10A uses a camless valvetrain in which intake and exhaust valve motion is not constrained by the position of the crankshaft, the intake valve 20 and the exhaust valve 24 can be used during engine shutdown to purge the engine of fumes in an efficient manner using the rotational energy remaining in the engine at key-off. In this manner, the fumes that would normally be trapped in the engine manifolds and cylinders are instead expelled through the warm emissions control device 52 (e.g., catalytic converter) when the engine is shut down. As a result, a noticeable improvement in emissions at engine start up can be realized. After the Purge Mode has repeated for a preset number of cycles of the engine 10 or 10A, the intake valves 20 and exhaust valves 24 are positioned in an open position (preferably, half open) by way of intake valve actuator 25 and exhaust valve actuator 26. At Step 309, the engine 10 or 10A has been shut down.

Figure 3B:
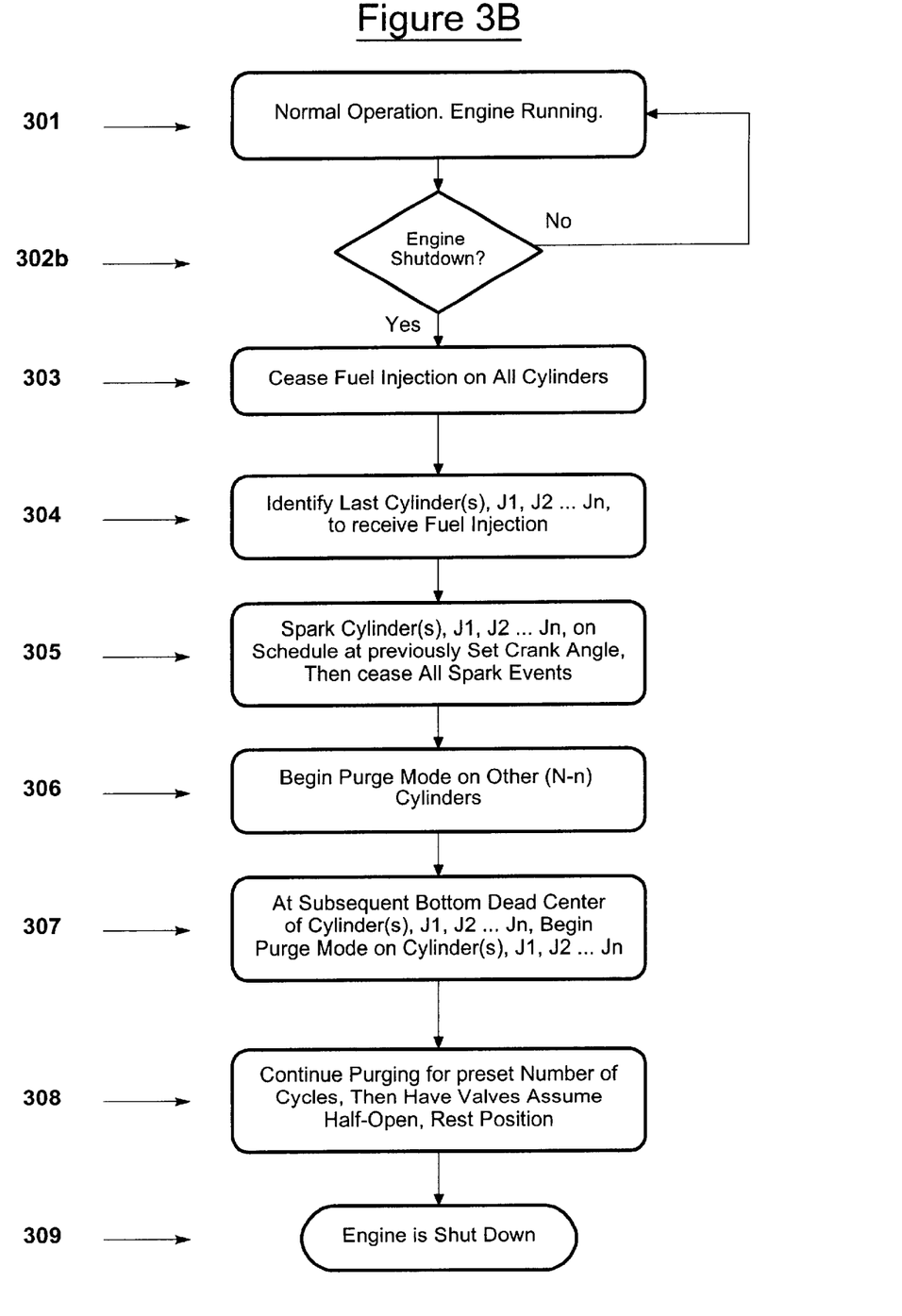
FIG. 3B is a block diagram of another program that may be stored in an engine controller for operating the engine shown in FIG. 1 or the engine shown in FIG. 1A.

Turning to FIG. 3B, there is shown a block diagram of another program that can be stored in the engine controller 30 for operating the engines 10 and 10A in accordance with the present invention. Steps 301 and 303 to 309 of the engine control program of FIG. 3B are identical to Steps 301 and 303 to 309 of the engine control program of FIG. 3A. However, in Step 302b of FIG. 3B, an alternative control strategy is implemented. In hybrid vehicle control strategies, the engine is sometimes shut off when the vehicle is stopped (e.g., at a traffic light) to conserve fuel, or at low loads when the vehicle is running on motor only. As a result, the hybrid vehicle engine has additional shutdown conditions that are not typically present in a conventional vehicle. In other words, a hybrid vehicle may have various engine shutdown conditions including, without limitation: (1) a shutdown condition when the engine on/off switch is in the off position; (2) a shutdown condition when the vehicle is stopped in traffic; and (3) a shutdown condition when the vehicle is running on motor only at low loads. Accordingly, as used herein, the term "shutdown condition" is not limited to engine conditions in which a vehicle engine on/off switch is in the off position.

At Step 302b of FIG. 3B, the controller 30 continually checks the key on/off signal from an engine on/off switch and also continually checks for the initiation of an engine shutdown condition, such as when the engine is shutdown when the vehicle is stopped in traffic or when the vehicle is running on motor only at low loads. If the controller 30 senses that the key on/off signal is at an "on" level (i.e., the key is in the "on" position) and that an engine shutdown has not been initiated, the engine shutdown check returns a "no" value and normal engine operation continues at Step 301. If the controller 30 senses that the key on/off signal is at an "off" level (i.e., the key is in the "off" position) or that an engine shutdown condition has been initiated, the engine shutdown check returns a "yes" value and the engine shutdown sequence of Steps 303 to 309 is initiated as described above for FIG. 3A. In this manner, the fumes that would normally be trapped in the engine manifolds and cylinders are instead expelled through the warm emissions control device 52 (e.g., catalytic converter) when the engine is in a shutdown condition, such as (i) when the engine is turned off, (ii) when the engine is shutdown when the vehicle is stopped in traffic, or (iii) when the engine is shutdown when the vehicle is running on motor only at low loads.

Figure 4A:
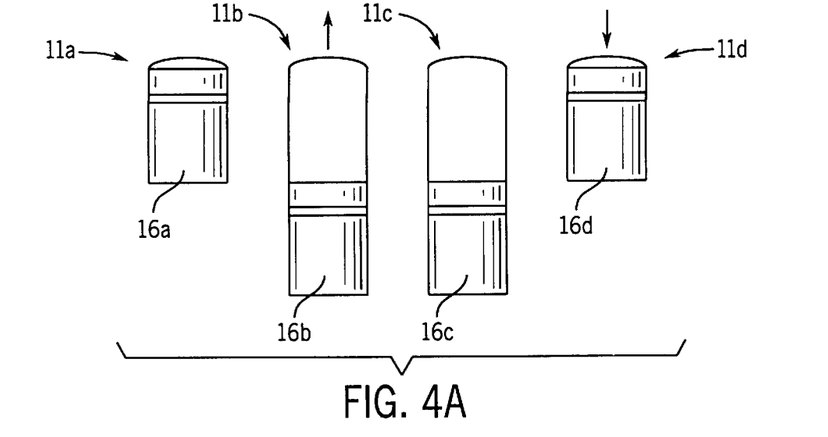
FIGS. 4A, 4B, 4C, and 4D show a sequence of piston movement in a four cylinder variable valve controlled engine.
Figure 4B:
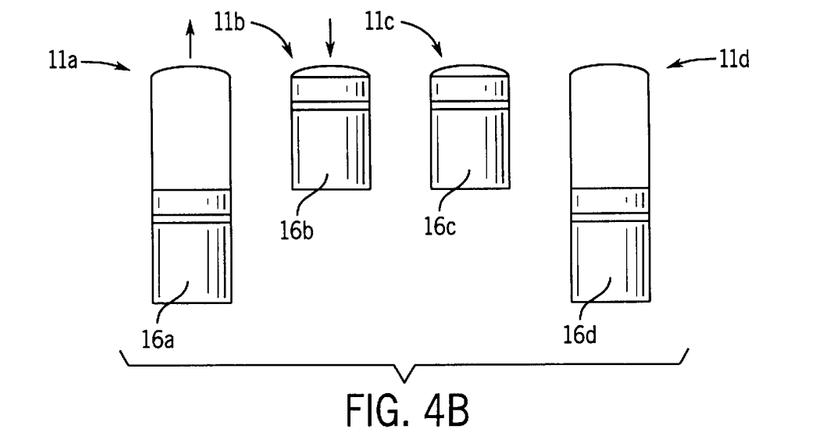
Figure 4C:
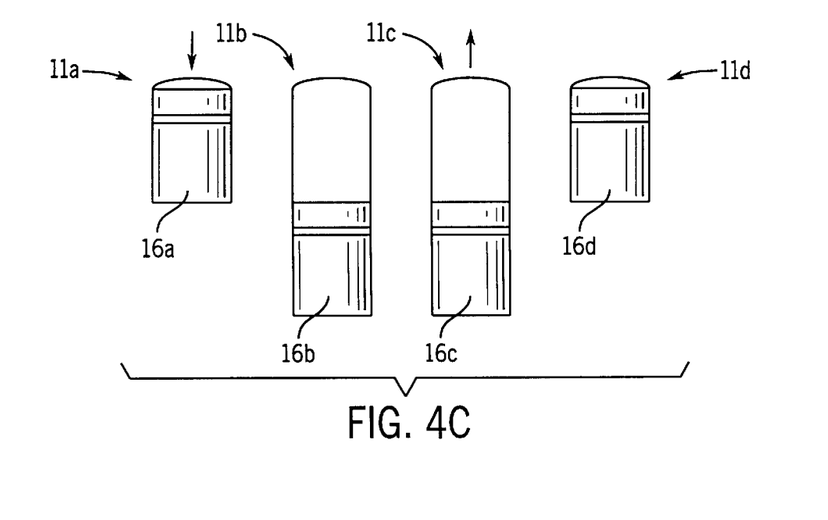
Figure 4D:
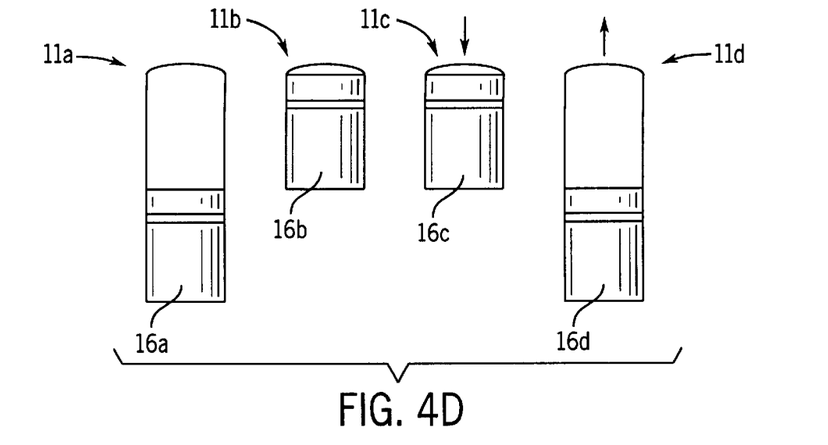

Referring now to FIGS. 4A, 4B, 4C, and 4D, there is shown a schematic example of a typical sequence of piston movement in a four cylinder variable valve controlled engine. The four cylinder engine uses a firing order of cylinder 11a, cylinder 11c, cylinder 11d and cylinder 11b. Looking at FIG. 4A, cylinder 11a is compressing and spark ignited, cylinder 11b is in position to exhaust combusted material on piston 16b up stroke, cylinder 11c is in position to compress on piston 16c up stroke, and cylinder 11d has just exhausted and is in position to start intake on piston 16d downstroke. In FIG. 4B, cylinder 11a is at the bottom of the expansion stroke and is in position to exhaust on piston 16a up stroke, cylinder 11b has completed the exhaust stroke and is in position to intake on piston 16b downstroke, cylinder 11c is compressing spark ignited, and cylinder 11d has completed the intake stroke and is in position to compress on piston 16d up stroke. In FIG. 4C, cylinder 11a has completed the exhaust stroke and is in position to intake on piston 16a downstroke, cylinder 11b has completed the intake stroke and is in position to compress on piston 16b up stroke, cylinder 11c has completed the expansion stroke and is in position to exhaust combusted gases on piston 16c up stroke, and cylinder 11d is compressing and spark ignited. In FIG. 4D, cylinder 11a has completed the intake stroke and is in position to compress on piston 16a up stroke, cylinder 11b is compressing and spark ignited, cylinder 11c has completed exhaust stroke and is in position to begin intake at piston 16c downstroke, and cylinder 11d has completed the expansion stroke and will exhaust on piston 16d up stroke.

Referring now to FIGS. 5A, 5B, 5C, 5D and 5E, there is shown an engine shut down sequence of piston movement in a four cylinder variable valve controlled engine in accordance with the present invention. After the controller 30 detects an engine shutdown condition as described above for FIGS. 3A and 3B, the engine shut down sequence schematically shown in FIGS. 5A–5E occurs. In the engine operating sequence as shown in FIGS. 5A–5E, it is assumed that the fuel injector associated with cylinder 11a has already injected and the fuel injector associated with cylinder 11c did not inject. After the controller 30 detects an engine shutdown condition, the controller 30 stops sending fuel control signals to each fuel injector, stops sending signals to each spark device (other than those in the last injected cylinder(s)), and sends signals to the intake valve actuator 25 and the exhaust valve actuator 26 to control motion of the intake valve 20 and exhaust valve 24, respectively.

Figure 5A:
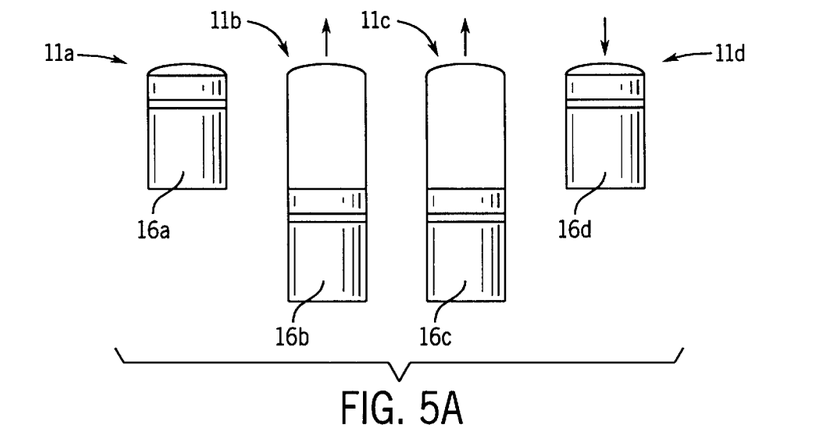
FIGS. 5A, 5B, 5C, 5D and 5E show an engine shutdown sequence of piston movement in a four cylinder variable valve controlled engine in accordance with the present invention.
Figure 5B:
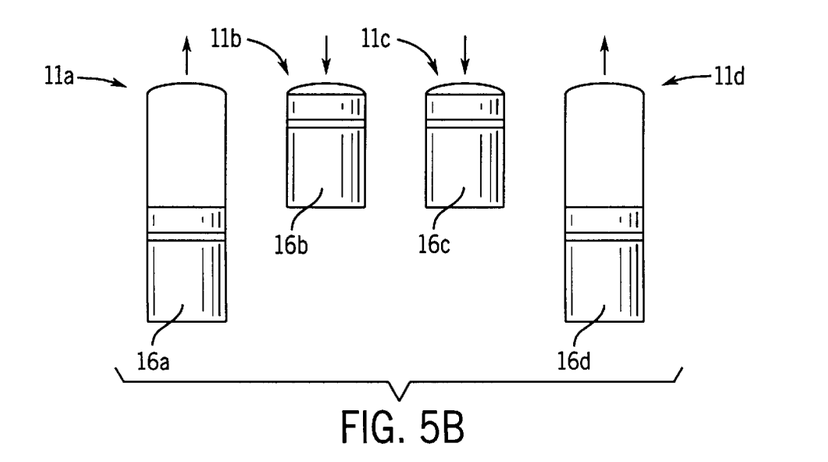
Figure 5C:
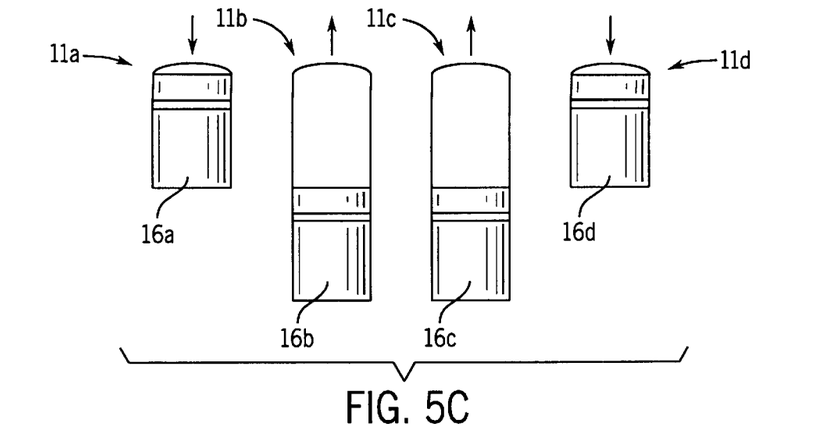
Figure 5D:
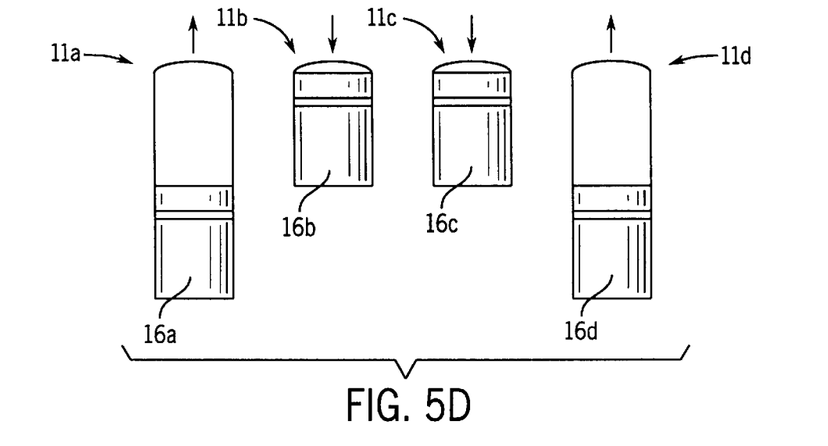
Figure 5E:
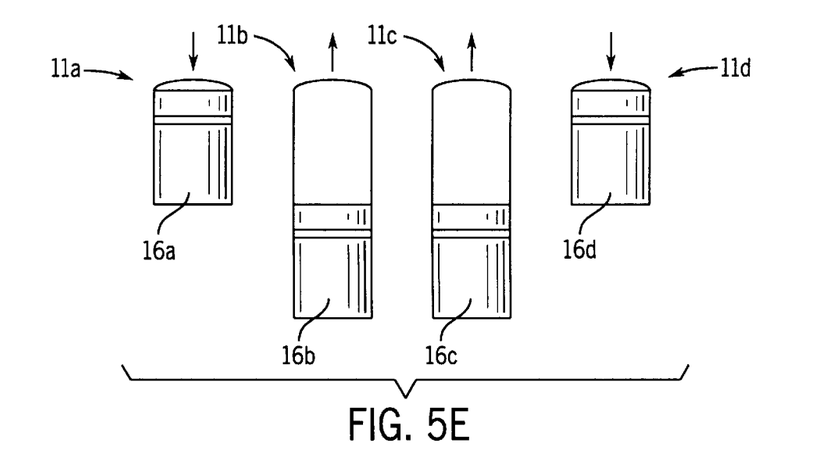

Specifically in the engine shutdown sequence of FIGS. 5A–5E, after the controller 30 detects an engine shutdown condition, the controller 30 stops sending signals to each fuel injector, and sends signals to each spark device and the intake valve actuator 25 and the exhaust valve actuator 26 such that: (1) fuel injection ceases, (2) cylinder 11a is spark ignited and thereafter all spark events cease, (3) cylinders 11b, 11c and 11d begin the Purge Mode described above immediately, and (4) cylinder 11a starts purging after the expansion stroke of the piston 16a. In FIG. 5A, cylinder 11a is compressed and spark ignited, cylinder 11b has completed the expansion stroke and will exhaust on the up stroke of the piston 16b, cylinder 11c has completed the intake stroke and will exhaust (non fuel injected) fresh air on the up stroke of the piston 16c, and cylinder 11d has exhausted its contents and will intake fresh air on the downstroke of the piston 16d. In FIG. 5B, cylinder 11a has completed the expansion stroke and is in position to exhaust on the piston 16a up stroke, cylinder 11b has completed the exhaust stroke and is in position to intake fresh air on the downstroke of piston 16b, cylinder 11c has exhausted fresh air and is in position to intake fresh air on the downstroke of piston 16c, and cylinder 11d has completed intake of fresh air and is in position to exhaust fresh air on the up stroke of piston 16d. In FIG. 5C, cylinder 11a has completed the exhaust stroke and will intake fresh air for the first time since shutdown on the downstroke of piston 16a, cylinder 11b has completed the intake stroke and will exhaust fresh air on the up stroke of piston 16b, cylinder 11c has completed the intake stroke and will exhaust fresh air on the up stroke of piston 16c, and cylinder 11d has completed the exhaust stroke and will intake fresh air on the downstroke of piston 16d. In FIG. 5D, cylinder 11a has completed the intake stroke and will exhaust fresh air on the up stroke of piston 16a, cylinders 11b and 11c have exhausted fresh air and will intake fresh air on the downstroke of piston 16b and 16c respectively, and cylinder 11d will exhaust fresh air on the up stroke of piston 16d. In FIG. 5E, cylinders 11a and 11d will intake fresh air on the downstroke of pistons 16a and 16d respectively, and cylinders 11b and 11c will exhaust fresh air on the up stroke of pistons 16b and 16c respectively.

Looking at FIGS. 5A to 5E together, it can be seen that once the last injected cylinder 11a has completed the expansion stroke as shown in FIG. 5B, the cylinders 11a, 11b, 11c and 11d are all in the Purge Mode in which (1) the exhaust valve 24 is opened when the piston is in upward motion (unless the exhaust valve 24 has already opened during the last ignited expansion stroke) thereby expelling the contents of the combustion chamber 19 out through the exhaust port 22, the exhaust manifold 42, and the emissions control device 52, (2) the exhaust valve 24 is thereafter closed after the piston 16 has been in upward motion for a time period or is at TDC, (3) the intake valve 20 is opened when the piston 16 is in downward motion to induct air into the combustion chamber 19 from the intake port 18, and (4) the intake valve 20 is thereafter closed after the piston 16 has been in downward motion for a time period or is at BDC. In this manner, the fumes that would normally be trapped in the engine manifolds and cylinders are instead expelled through the warm emissions control device 52 (e.g., catalytic converter) when the engine is shut down.

Thus, it can be seen that there has been provided a four-stroke reciprocating piston internal combustion engine in which fuel and exhaust vapors are purged from the engine manifolds and each cylinder when the engine is turned off or in a shutdown condition in order to minimize emissions on subsequent engine startup. In addition, there has been provided a clean internal combustion engine shutdown method wherein fuel and exhaust vapors that would normally be trapped in the intake manifold and cylinders when the engine is turned off or shutdown are instead expelled through the warm catalytic converter when the engine is shut down, thereby producing a noticeable improvement in engine emissions during engine startup.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A four-stroke reciprocating internal combustion engine comprising:
    a combustion chamber defined by a cylinder, a reciprocating piston contained within the cylinder, and a cylinder head;
    an exhaust port in fluid communication with the combustion chamber and an exhaust manifold, the exhaust port including an exhaust valve, the exhaust manifold being in fluid communication with an emissions control device;
    an intake port in fluid communication with the combustion chamber, the intake port being in fluid communication with a fuel injector for directing fuel into air in the intake port to form an air-fuel mixture, the intake port including an intake valve, the cylinder including a spark device for igniting the air-fuel mixture introduced into the combustion chamber through the intake port;
    at least one sensor for sensing at least one engine operating condition; and
    a controller, responsive to each sensor, for providing fuel injector control signals to the fuel injector for operating the fuel injector, for providing spark device control signals to the spark device for operating the spark device, and for providing valve control signals to a variable valve timing system for operating the exhaust valve and the intake valve, the controller executing a stored program to:
        (a) sense when the engine is in a shutdown condition,
        (b) thereafter cease fuel injection from the fuel injector,
        (c) thereafter operate the spark device to ignite the air-fuel mixture in the combustion chamber,
        (d) thereafter open the exhaust valve, and
        (e) thereafter close the exhaust valve after the reciprocating piston has been in upward motion for a time period, and
        (f) thereafter open the intake valve when the reciprocating piston is in downward motion,
        (g) thereafter close the intake valve after the reciprocating piston has been in downward motion for a time period, and
        (h) thereafter open the exhaust valve when the reciprocating piston is in upward motion.

2. The engine of claim 1 wherein the controller executes a stored program to:
    (i) repeat steps (e) to (h) at least one time.

3. The engine of claim 2 wherein the controller executes a stored program to:
    (j) thereafter open the intake valve.

4. The engine of claim 1 wherein:
    step (b) of the stored program comprises sensing whether fuel injection is in process and ceasing fuel injection from the fuel injector after fuel injection is complete.

5. The engine of claim 1 wherein:
    step (d) comprises opening the exhaust valve immediately after upward motion of the reciprocating piston begins,
    step (e) comprises closing the exhaust valve immediately before upward motion of the reciprocating piston ends,
    step (f) comprises opening the intake valve immediately after downward motion of the reciprocating piston begins, and
    step (g) comprises closing the intake valve immediately before downward motion of the reciprocating piston ends.

6. The engine of claim 1 wherein:

the engine includes an engine on/off switch including an off position, the engine on/off switch capable of being moved into the off position to turn off the engine, and step (a) comprises sensing when the engine on/off switch has been moved into the off position.

7. A four-stroke reciprocating internal combustion engine comprising:

at least two combustion chambers, each combustion chamber being defined by a cylinder, a reciprocating piston contained within the cylinder, and a cylinder head;

an exhaust port in fluid communication with each combustion chamber, each exhaust port including an exhaust valve, each exhaust port being in fluid communication with an exhaust manifold, the exhaust manifold being in fluid communication with an emissions control device;

an intake port associated with and in fluid communication with each combustion chamber, each intake port being in fluid communication with a fuel injector for directing fuel into air in the intake port to form an air-fuel mixture, each intake port including an intake valve, each cylinder including a spark device for igniting the air-fuel mixture introduced into each combustion chamber through its associated intake port;

at least one sensor for sensing at least one engine operating condition; and a controller, responsive to each sensor, for providing fuel injector control signals to each fuel injector for operating each fuel injector, for providing spark device control signals to each spark device for operating each spark device, and for providing valve control signals to a variable valve timing system for operating each exhaust valve and each intake valve, the controller executing a stored program to:

(a) sense when the engine is in a shutdown condition, (b) thereafter cease fuel injection from each fuel injector and identify a last injected combustion chamber wherein the associated intake port was receiving or had last received fuel from the fuel injector when the controller sensed that the engine was in a shutdown condition, (c) thereafter operate the spark device associated with the last injected combustion chamber to ignite the air-fuel mixture in the last injected combustion chamber, (d) open each exhaust valve of each combustion chamber other than the last injected combustion chamber when each reciprocating piston is in upward motion, (e) thereafter close each exhaust valve of each combustion chamber other than the last injected combustion chamber after each reciprocating piston has been in upward motion for a time period, (f) open each intake valve of each combustion chamber other than the last injected combustion chamber when each reciprocating piston is in downward motion, (g) thereafter close each intake valve of each combustion chamber other than the last injected combustion chamber after each reciprocating piston has been in downward motion for a time period, (h) thereafter open each exhaust valve of each combustion chamber other than the last injected combustion chamber when each reciprocating piston is in upward motion, (i) after the spark device has ignited the air-fuel mixture in the last injected combustion chamber, cease operation of the spark device and open the exhaust valve of the last injected combustion chamber, (j) thereafter close the exhaust valve of the last injected combustion chamber after its associated reciprocating piston has been in upward motion for a time period, (k) thereafter open the intake valve of the last injected combustion chamber when its associated reciprocating piston is in downward motion, (l) thereafter close the intake valve of the last injected combustion chamber after its associated reciprocating piston has been in downward motion for a time period, and (m) thereafter open the exhaust valve of the last injected combustion chamber when its associated reciprocating piston is in upward motion.

8. The engine of claim 7 wherein the controller executes a stored program to:

(n) repeat steps (e) to (h) at least one time, and (o) repeat steps (j) to (m) at least one time.

9. The engine of claim 8 wherein the controller executes a stored program to:

(p) thereafter open each intake valve of each combustion chamber other than the last injected combustion chamber, and (q) thereafter open the intake valve of the last injected combustion chamber.

10. The engine of claim 7 wherein:

step (b) of the stored program comprises sensing whether fuel injection is in process and ceasing fuel injection from each fuel injector after fuel injection is complete.

11. The engine of claim 7 wherein:

step (d) comprises opening each exhaust valve of each combustion chamber other than the last injected combustion chamber immediately after upward motion of the reciprocating piston begins, step (e) comprises closing each exhaust valve of each combustion chamber other than the last injected combustion chamber immediately before upward motion of the reciprocating piston ends, step (f) comprises opening each intake valve of each combustion chamber other than the last injected combustion chamber immediately after downward motion of the reciprocating piston begins, step (g) comprises closing each intake valve of each combustion chamber other than the last injected combustion chamber immediately before downward motion of the reciprocating piston ends, step (i) comprises opening each exhaust valve of the last injected combustion chamber immediately after upward motion of the reciprocating piston begins, step (j) comprises closing each exhaust valve of the last injected combustion chamber immediately before upward motion of the reciprocating piston ends, step (k) comprises opening each intake valve of the last injected combustion chamber immediately after downward motion of the reciprocating piston begins, and step (l) comprises closing each intake valve of the last injected combustion chamber immediately before downward motion of the reciprocating piston ends.

12. The engine of claim 7 wherein:

the engine includes an engine on/off switch including an off position, the engine on/off switch capable of being moved into the off position to turn off the engine, and step (a) comprises sensing when the engine on/off switch has been moved into the off position.

13. A four-stroke reciprocating internal combustion engine comprising:

a combustion chamber defined by a cylinder, a reciprocating piston contained within the cylinder, and a cylinder head;

an exhaust port in fluid communication with the combustion chamber and an exhaust manifold, the exhaust port including an exhaust valve, the exhaust manifold being in fluid communication with an emissions control device;

an intake port in fluid communication with the combustion chamber for directing intake air into the combustion chamber, the intake port including an intake valve;

a fuel injector in fluid communication with the combustion chamber, the fuel injector being positioned to direct fuel into the intake air to create an air-fuel mixture;

a spark device located in the cylinder for igniting the air-fuel mixture in the combustion chamber;

at least one sensor for sensing at least one engine operating condition; and a controller, responsive to each sensor, for providing fuel injector control signals to the fuel injector for operating the fuel injector, for providing spark device control signals to the spark device for operating the spark device, and for providing valve control signals to a variable valve timing system for operating the exhaust valve and the intake valve, the controller executing a stored program to:

(a) sense when the engine is in a shutdown condition,
(b) thereafter cease fuel injection from the fuel injector,
(c) thereafter operate the spark device to ignite the air-fuel mixture in the combustion chamber,
(d) thereafter open the exhaust valve,
(e) thereafter close the exhaust valve after the reciprocating piston has been in upward motion for a time period, and
(f) thereafter open the intake valve when the reciprocating piston is in downward motion,
(g) thereafter close the intake valve after the reciprocating piston has been in downward motion for a time period, and
(h) thereafter open the exhaust valve when the reciprocating piston is in upward motion.

14. The engine of claim 13 wherein the controller executes a stored program to:
(i) repeat steps (e) to (h) at least one time.

15. The engine of claim 14 wherein the controller executes a stored program to:
(j) thereafter open the intake valve.

16. The engine of claim 13 wherein:
step (b) of the stored program comprises sensing whether fuel injection is in process and ceasing fuel injection from the fuel injector after fuel injection is complete.

17. The engine of claim 13 wherein:
step (d) comprises opening the exhaust valve immediately after upward motion of the reciprocating piston begins,
step (e) comprises closing the exhaust valve immediately before upward motion of the reciprocating piston ends,
step (f) comprises opening the intake valve immediately after downward motion of the reciprocating piston begins, and
step (g) comprises closing the intake valve immediately before downward motion of the reciprocating piston ends.

18. The engine of claim 13 wherein:
the engine includes an engine on/off switch including an off position, the engine on/off switch capable of being moved into the off position to turn off the engine, and
step (a) comprises sensing when the engine on/off switch has been moved into the off position.

19. A four-stroke reciprocating internal combustion engine comprising:

at least two combustion chambers, each combustion chamber being defined by a cylinder, a reciprocating piston contained within the cylinder, and a cylinder head;

an exhaust port in fluid communication with each combustion chamber, each exhaust port including an exhaust valve, each exhaust port being in fluid communication with an exhaust manifold, the exhaust manifold being in fluid communication with an emissions control device;

an intake port associated with and in fluid communication with each combustion chamber for directing intake air into the combustion chamber, each intake port including an intake valve;

a fuel injector in fluid communication with each combustion chamber, each fuel injector being positioned to direct fuel into the intake air in each combustion chamber to create an air-fuel mixture in each combustion chamber;

a spark device located in each cylinder for igniting the air-fuel mixture in each combustion chamber;

at least one sensor for sensing at least one engine operating condition; and a controller, responsive to each sensor, for providing fuel injector control signals to each fuel injector for operating each fuel injector, for providing spark device control signals to each spark device for operating each spark device, and for providing valve control signals to a variable valve timing system for operating each exhaust valve and each intake valve, the controller executing a stored program to:

(a) sense when the engine is in a shutdown condition,
(b) thereafter cease fuel injection from each fuel injector and identify a last injected combustion chamber wherein the combustion chamber was receiving or had last received fuel from the fuel injector when the controller sensed that the engine was in a shutdown condition,
(c) thereafter operate the spark device associated with the last injected combustion chamber to ignite the air-fuel mixture in the last injected combustion chamber,
(d) open each exhaust valve of each combustion chamber other than the last injected combustion chamber when each reciprocating piston is in upward motion,
(e) thereafter close each exhaust valve of each combustion chamber other than the last injected combustion chamber after each reciprocating piston has been in upward motion for a time period,
(f) open each intake valve of each combustion chamber other than the last injected combustion chamber when each reciprocating piston is in downward motion,
(g) thereafter close each intake valve of each combustion chamber other than the last injected combustion chamber after each reciprocating piston has been in downward motion for a time period,
(h) thereafter open each exhaust valve of each combustion chamber other than the last injected combustion chamber when each reciprocating piston is in upward motion, (i) after the spark device has ignited the air-fuel mixture in the last injected combustion chamber, cease operation of the spark device and open the exhaust valve of the last injected combustion chamber, (j) thereafter close the exhaust valve of the last injected combustion chamber after its associated reciprocating piston has been in upward motion for a time period, (k) thereafter open the intake valve of the last injected combustion chamber when its associated reciprocating piston is in downward motion, (l) thereafter close the intake valve of the last injected combustion chamber after its associated reciprocating piston has been in downward motion for a time period, and (m) thereafter open the exhaust valve of the last injected combustion chamber when its associated reciprocating piston is in upward motion.

20. The engine of claim 19 wherein the controller executes a stored program to:

(n) repeat steps (e) to (h) at least one time, and (o) repeat steps (j) to (m) at least one time.

21. The engine of claim 20 wherein the controller executes a stored program to:

(p) thereafter open each intake valve of each combustion chamber other than the last injected combustion chamber, and (q) thereafter open the intake valve of the last injected combustion chamber.

22. The engine of claim 19 wherein:

step (b) of the stored program comprises sensing whether fuel injection is in process and ceasing fuel injection from each fuel injector after fuel injection is complete.

23. The engine of claim 19 wherein:

step (d) comprises opening each exhaust valve of each combustion chamber other than the last injected combustion chamber immediately after upward motion of the reciprocating piston begins, step (e) comprises closing each exhaust valve of each combustion chamber other than the last injected combustion chamber immediately before upward motion of the reciprocating piston ends, step (f) comprises opening each intake valve of each combustion chamber other than the last injected combustion chamber immediately after downward motion of the reciprocating piston begins, step (g) comprises closing each intake valve of each combustion chamber other than the last injected combustion chamber immediately before downward motion of the reciprocating piston ends, step (i) comprises opening each exhaust valve of the last injected combustion chamber immediately after upward motion of the reciprocating piston begins, step (j) comprises closing each exhaust valve of the last injected combustion chamber immediately before upward motion of the reciprocating piston ends, step (k) comprises opening each intake valve of the last injected combustion chamber immediately after downward motion of the reciprocating piston begins, and step (l) comprises closing each intake valve of the last injected combustion chamber immediately before downward motion of the reciprocating piston ends.

24. The engine of claim 19 wherein:

the engine includes an engine on/off switch including an off position, the engine on/off switch capable of being moved into the off position to turn off the engine, and step (a) comprises sensing when the engine on/off switch has been moved into the off position.

25. A four-stroke reciprocating internal combustion engine comprising:

a combustion chamber defined by a cylinder, a reciprocating piston contained within the cylinder, and a cylinder head;

an exhaust port in fluid communication with the combustion chamber and an exhaust manifold, the exhaust port including an exhaust valve, the exhaust manifold being in fluid communication with an emissions control device;

an intake port in fluid communication with the combustion chamber for directing intake air into the combustion chamber, the intake port including an intake valve;

a fuel injector positioned for directing fuel into intake air in the intake port or positioned for directing fuel into intake air in the combustion chamber to form an air-fuel mixture;

a spark device for igniting the air-fuel mixture in the combustion chamber;

at least one sensor for sensing at least one engine operating condition; and a controller, responsive to each sensor, for providing fuel injector control signals to the fuel injector for operating the fuel injector, for providing spark device control signals to the spark device for operating the spark device, and for providing valve control signals to a variable valve timing system for operating the exhaust valve and the intake valve, the controller executing a stored program to:

(a) sense when the engine is in a shutdown condition, (b) thereafter cease fuel injection from the fuel injector, (c) thereafter operate the spark device to ignite the air-fuel mixture in the combustion chamber, (d) thereafter open the exhaust valve, and (e) thereafter close the exhaust valve after the reciprocating piston has been in upward motion for a time period, and (f) thereafter open the intake valve when the reciprocating piston is in downward motion, (g) thereafter close the intake valve after the reciprocating piston has been in downward motion for a time period, and (h) thereafter open the exhaust valve when the reciprocating piston is in upward motion.

26. The engine of claim 25 wherein the controller executes a stored program to:

(i) repeat steps (e) to (h) at least one time.

27. The engine of claim 26 wherein the controller executes a stored program to:

(j) thereafter open the intake valve.

28. The engine of claim 25 wherein:

step (b) of the stored program comprises sensing whether fuel injection is in process and ceasing fuel injection from the fuel injector after fuel injection is complete.

29. The engine of claim 25 wherein:

step (d) comprises opening the exhaust valve immediately after upward motion of the reciprocating piston begins, step (e) comprises closing the exhaust valve immediately before upward motion of the reciprocating piston ends, step (f) comprises opening the intake valve immediately after downward motion of the reciprocating piston begins, and step (g) comprises closing the intake valve immediately before downward motion of the reciprocating piston ends.

30. The engine of claim 25 wherein:

the engine includes an engine on/off switch including an off position, the engine on/off switch capable of being moved into the off position to turn off the engine, and step (a) comprises sensing when the engine on/off switch has been moved into the off position.

* * * * *